US007528735B2

(12) United States Patent
Cosmao et al.

(10) Patent No.: US 7,528,735 B2
(45) Date of Patent: May 5, 2009

(54) METHOD FOR CONTROLLING DEVICES WITHIN A NETWORK BY DEDICATED REMOTE CONTROL AND DEVICES FOR CARRYING OUT SAID METHOD

(75) Inventors: Michel Cosmao, Liffre (FR); Jean-Baptiste Henry, Melesse (FR); Willem Lubbers, Cesson Sevigne (FR)

(73) Assignee: Thomson Licensing, Boulogne-Billancourt (FR)

( * ) Notice: Subject to any disclaimer, the term of this patent is extended or adjusted under 35 U.S.C. 154(b) by 223 days.

(21) Appl. No.: 10/541,857

(22) PCT Filed: Jan. 8, 2004

(86) PCT No.: PCT/EP2004/050006

§ 371 (c)(1),
(2), (4) Date: Jul. 11, 2005

(87) PCT Pub. No.: WO2004/086680

PCT Pub. Date: Oct. 7, 2004

(65) Prior Publication Data

US 2006/0125651 A1 Jun. 15, 2006

(30) Foreign Application Priority Data

Jan. 10, 2003 (FR) .................................. 03 00223

(51) Int. Cl.
*G05B 19/02* (2006.01)
(52) U.S. Cl. .............................. 340/825.24; 340/825.69
(58) Field of Classification Search ............ 340/825.24, 340/825.23, 825, 533, 534, 825.72, 825.69
See application file for complete search history.

(56) References Cited

U.S. PATENT DOCUMENTS

| | | | |
|---|---|---|---|
| 6,466,971 B1 | 10/2002 | Humpleman et al. | |
| 6,801,507 B1 * | 10/2004 | Humpleman et al. | 370/257 |
| 6,944,704 B2 * | 9/2005 | Brelin | 710/305 |
| 7,053,811 B2 * | 5/2006 | Aratani et al. | 341/173 |
| 2002/0013146 A1 | 1/2002 | Albrecht | |
| 2002/0087746 A1 | 7/2002 | Ludtke et al. | |
| 2006/0049935 A1 * | 3/2006 | Giannopoulos et al. | 340/533 |

OTHER PUBLICATIONS

Search Report Dated May 6, 2004.

* cited by examiner

*Primary Examiner*—Brian A Zimmerman
*Assistant Examiner*—Nabil H Syed
(74) *Attorney, Agent, or Firm*—Robert D. Shedd; Joseph J. Opalach; Reitseng Lin (57) ABSTRACT

The invention relates to a method of controlling devices linked by a digital communication network, a device having a control device—typically a remote control—that is dedicated to it; the control device comprising command input means—typically keys—for entering commands. The method consists initially in running on each device to be controlled a step for configuring the associations between network device functions and command input means, then, when a means is activated, in sending a message including the code corresponding to the device associated with this key. A refinement consists in associating a number of devices with one and the same key, and in sending as many messages as there are associated devices when the key is activated. The invention also relates to a device provided with a remote control and an interface for implementing the method.

14 Claims, 2 Drawing Sheets

METHOD FOR CONTROLLING DEVICES WITHIN A NETWORK BY DEDICATED REMOTE CONTROL AND DEVICES FOR CARRYING OUT SAID METHOD

This application claims the benefit, under 35 U.S.C. § 365 of International Application PCT/EP04/050006, filed Jan. 8, 2004, which was published in accordance with PCT Article 21(2) on Oct. 7, 2004 in French and which claims the benefit of French patent application No. 0300223, filed Jan. 10,2003.

FIELD OF THE INVENTION

The invention relates to a method of managing resources within a digital communication network, and the resources associated with the method. The invention applies more particularly when the resources are user command input means.

BACKGROUND

A digital communication network comprises devices interlinked by a communication bus, for example the IEEE 1394 bus, or the IP bus, by wired or wireless means. A domestic type digital communication network includes, for example, the following devices: terminals enabling users to store and view audiovisual documents, digital television receivers (a set-top-box, for example) capable of receiving audiovisual documents originating from a transmission network or from a point-by-point type network (Internet for example), an audiovisual document storage device (a video recorder), a modem, etc. The list of devices is not exhaustive. There can be multiple instances of the devices within the digital communication network; for example, it is possible to imagine that, in a home, each room has a terminal of the same type. Each of the connected devices has a command input means which can be a keyboard, a mouse, a remote control, a joystick, a voice recognition means using a microphone, or any other means enabling a user to act on an electronic device. In other cases, the devices are not provided with a remote control and can be controlled only by front panel buttons.

The devices connected to a 1394 network can, for example, intercommunicate using the HAVi protocol by providing the others with a software interface called an application programming interface (API). In this way, if a first device needs the API of a second device, they can intercommunicate. Some devices may be provided with dedicated input devices. It may be advantageous for a user to control a device on the network using an input device dedicated to another device.

Patent application WO01/50219, filed by VM LABS Inc and published on 12 Jul. 2001, describes a system that can be used to connect a number of user command input devices such as: a joystick, a mouse and a keyboard. All the equipment described by this system is linked by a 1394 bus to a master central processing unit: a microcomputer. This system is thus centralized and the user command input devices are in fact dedicated to the master central processing unit which receives and processes the commands sent by the user. A user command generated on such an input device but intended for another central processing unit must pass through the master central processing unit which remains the unit controlling the input device, although the latter is not the central processing unit receiving the command. This way of communicating is not efficient because the device connected to the input device keeps its master status even though it should be considered only as an intermediate device.

Another solution would involve considering each command input means as a HAVi type device. Each device on the network having its own communication API (called Havlet), the command input device must download as many APIs as there are devices, which makes communication complicated and multiplies the interchanges. Such a solution means that, before an input device can be used, the user must always indicate to the network the device to be used and therefore the Havlet to be loaded.

U.S. Pat. No. 6,466,971—HUMPLEMAN describes in its preamble how audiovisual devices are often controlled from one and the same remote control. Because of this, the manufacturers have developed control units for controlling the devices from one and the same interface. If a device (2) wants to be controlled by another device (1), the device (2) downloads its interface API into the device (1) which can then control it. By extension, if a number of devices (2, 2', 2") want to be controlled by the device (1), it is a different interface that is loaded each time. The present invention avoids having to download different interfaces and thus allows for a far greater degree of standardization.

US document 2002/087746—LUDTKE also describes how, if a device (2) wants to be controlled by another device (1), the device (2) downloads its interface API into the device (1) which can then control it.

The present invention also enables the sharing of resources enabling a user to enter user commands to be better organized, even if the input means is dedicated to a device on the network.

SUMMARY OF THE INVENTION

The present invention consists of a method of controlling a number of first devices linked by a communication network to a second device associated with a control device which is dedicated to it, the control device comprising command input means; wherein it comprises:

a step for starting, on each first device to be controlled, a step for configuring at least one association between a function of a first device and an input means, the association being transmitted by a request from a first device to a management interface of the control device available in the second device, when one of the input means of the control device is activated: a step for transmission by the second device to the first device associated with this means of inputing control information identifying the means activated to execute the function on the first device.

In this way, each device of the network can communicate with a device having a remote control and a management interface, and can configure keys of the remote control for its own use and not for the device dedicated to this remote control.

With the management interface of the control device, the present invention enables this device, typically a remote control, to control a number of devices with a generic interface. For this, these devices must register with this interface and, contrary to what happens in the standard HAVi protocol and in the abovementioned prior art, the device to be controlled calls the management interface and registers with the latter. The user programs associations between command input means, typically keys of the remote control and a functionality of a device chosen from a plurality. Thus, the control device becomes generic to a number of devices even though, at the outset, it is dedicated to a defined device. The interface is called by the devices that want to be controlled in this way.

According to a refinement, in response to a configuration request, the second device sends information indicating the absence of availability of the or each input means identified in the request. In this way, the device knows that the command input means is not available and that its association request has not been successful.

According to another refinement, in response to a configuration request, the second device sends information indicating the validation of the association on the second device of the input means identified in the request. In this way, the device knows that the command input means is available and that its association request is registered. Advantageously, it also knows if other first devices are associated with the input means.

According to another refinement, when a device is deactivated, the associations with this device are deleted to allow other associations with other devices for this means.

According to another refinement, a configuration request associates a number of input means having a common characteristic with a first device. In this way, a number of associations with a number of input means can be set up in the same request.

According to another refinement, the second device transmits the list of available input means. The user can thus choose from the input means those that he wants to associate with the device currently being configured. According to another refinement, the second device transmits the list of associations programmed in the preceding configuration steps, so informing a first device as to what has already been configured on the second device, and enabling it to check that its own associations have indeed been registered.

Another subject of the invention is a device having a means of connection with a communication network and receiving signals from a dedicated control device provided with command input means such as keys; wherein it includes an association means activated by another device connected to the network, said means storing in memory association data between an input means and the identifier of this other device, and a means of transmitting a block of data over the communication network, said transmission means being activated when a command is input on the dedicated control device, said data block including an identifier of the command input and being intended for the device associated with this command.

BRIEF DESCRIPTION OF THE DRAWINGS

Other features and advantages of the present invention will become apparent from the description of the exemplary embodiments below, given by way of non-limiting examples, with reference to the appended figures in which.

DETAILED DESCRIPTION

Figure 1:
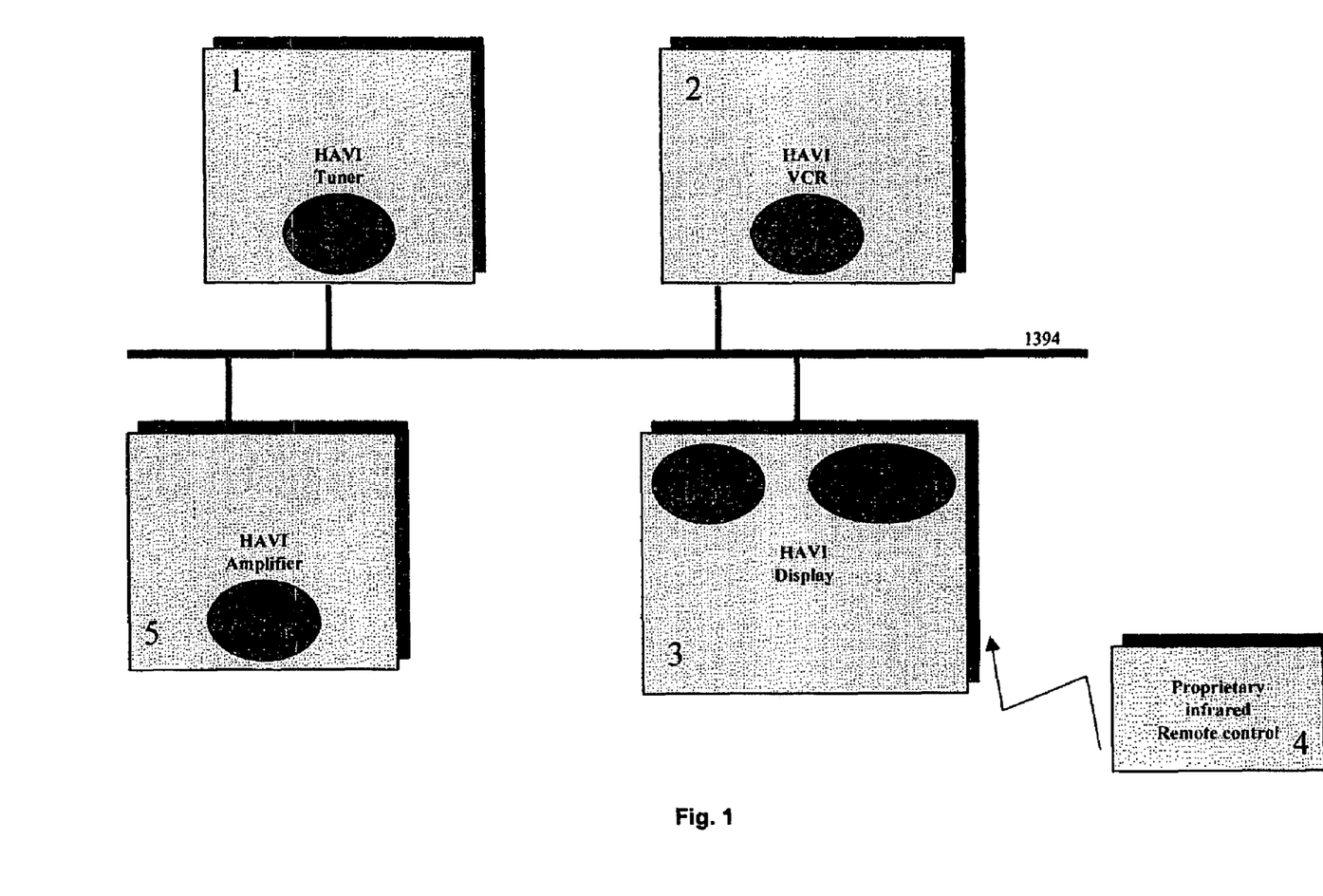
FIG. 1 represents a diagram of a digital communication network according to an exemplary embodiment of the invention.

A digital communication network according to a present exemplary embodiment is described diagrammatically in FIG. 1; it is preferably, but not exclusively, domestic. The devices are interlinked by a digital bus using, for example, the HAVi standard based on an IEEE 1394 type architecture. It therefore has an "FCM" type API, enabling other devices to intercommunicate.

The domestic network comprises, for example, the following devices:

a tuner 1 for receiving transmissions from a transmission network. This device contains its API called "FCM Tuner".

a video recorder, or "VCR" 2 for recording transmissions received for example from the tuner 1. This device also includes its API called "FCM VCR".

a television screen 3 for viewing transmissions recorded in the VCR 2 or received from the tuner 1. This device has its API called "FCM Display" to control the display of the transmissions and another API called "FCM Remote Control" for the communication interface with a remote control dedicated to the screen.

an audio amplifier 4 for reproducing the audio signals of the transmissions. This device also contains its API called "FCM Amplifier".

Digital communication networks provided with other communication protocols can implement the present invention, such as, for example, the IP network linking UPnP devices. In such a network, the devices will look for their graphical interface via an HTML page which will be displayed using a browser.

Let us assume that a user chooses to control the Tuner, the VCR and the amplifier with the remote control dedicated to the television screen. For example, the user decides that:

the "P+" and "P−" keys control the tuner and are used to choose the channel.

the "V+" and "V−" keys control the audio amplifier 4 and are used to increase or reduce the sound volume.

the "PLAY", "STOP", "PAUSE", "FAST FORWARD", "FAST REWIND" keys control the familiar functions of a VCR.

The user will first of all configure the communication interfaces of these four devices to assign to the corresponding device one or more keys of the remote control. For this, on each of the three devices to be controlled, the user runs a configuration program available on each device. Initially, the configuration program sends a request over the digital communication network to find out whether a generic API is available. If a negative response is received (or no response at all), the configuration program informs the user of this. However, if a positive response is received, the configuration program receives from the API the list of control means, for example: buttons, switches, or even a list of words recognized by a voice recognition engine, available on the remote control associated with the API.

The user can then choose the control means to be associated with the device on which the configuration program is running. The configuration is set up using a user interface, for example an LCD screen on the device to be configured and a number of keys on the front of the device, or even a graphical interface downloaded to an HAVi screen (havlet) enabling dialogue with the device to be configured. The configuration program sends to the generic API configuration requests which will be explained later. The configuration step ends when all the associations between the control means and the device to be controlled have been registered on the generic API.

The generic API contained in the device having a dedicated remote control, in this instance the television screen 3, may be resident (and stored in a non-volatile memory) or downloadable via a network. In use, the API checks the codes sent by the remote control and, according to the associations received, determines whether the command is intended for the television screen 3 or for one of the three other devices connected to the network. In this latter case, the API transmits the command to the associated device.

Figure 2:
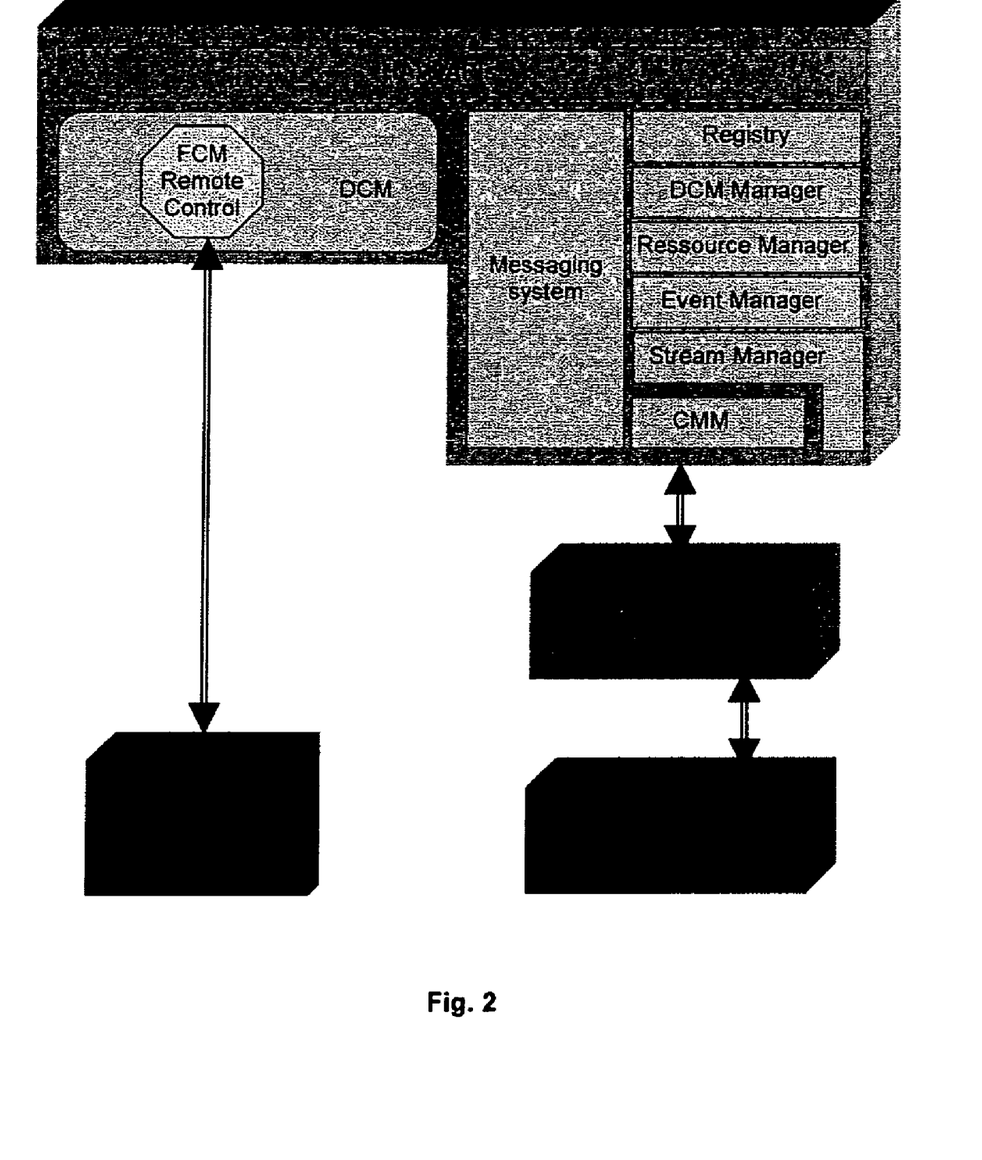
FIG. 2 represents the HAVi architecture on the device having a remote control and the situation of the generic API.

FIG. 2 shows the HAVi architecture on the device having a remote control and situates the generic API within the HAVi stack. The generic API is a module declared as a functional component module (FCM) and available on the device controlled preferentially by this remote control. It is represented by a pentagon in FIG. 2. This device, being declared to all the HAVi network, proposes the API to the other devices connected to the network so that they can be aware of it. Then, during the configuration step described previously, these other devices can send to the device having a dedicated remote control one or more control/device associations. The non-volatile memory of each device associated with a dedicated remote control registers the association, the memory being a non-volatile flash type circuit or a hard disk, for example.

According to the prior art, when a first device wants to control a second device, it has to download a graphical interface program called a "Havlet" according to the HAVi standard or called an HTML presentation page according to the UPnP standard of the device having the generic API. For the user, this consists initially in downloading a graphical application to a screen (which totally or partly conceals the audio/video document already present on the screen, and therefore becomes a nuisance for the user). Then, in a second step, the user navigates within this application using the keys of the remote control associated with the screen to focus the application on desired graphic button and press the OK key on the remote control. The generic API avoids this tedious step for the user by simplifying the procedure on a simple command such as to alter the volume of an amplifier via the V+ and V− buttons or to flip from one channel to another via the P+ P− buttons, and which consumes memory space and communication time. In a particularly simple way, the generic API can be used to control numerous simple functions, such as, for example, for a VCR, the "play", "fast forward", "record", and other controls. According to the present embodiment of the invention, the remote control does not require a graphical interface, but only the transmission of short messages identifying the command input by the user on a remote control, and the device associated with this command.

There now follows a description of an exemplary embodiment of the generic API. According to the present exemplary embodiment, the generic API is a software module executing various functions corresponding to services accessible to another HAVi-type declared device. Table 1 below summarizes the various functions accessible in the API:

TABLE 1

| Function number | Function name |
|---|---|
| 1 | CR: connect |
| 2 | CR: disconnect |
| 3 | CR: is supported |
| 4 | CR: get capabilities |
| 5 | CR: add key |
| 6 | CR: remove key |
| 7 | CR: add all keys |
| 8 | CR: remove all keys |
| 9 | CR: add all arrow keys |
| 10 | CR: remove all arrow keys |
| 11 | CR: add all numeric keys |
| 12 | CR: remove all numeric keys |
| 13 | CR: add all color keys |
| 14 | CR: remove all color keys |
| 15 | CR: force feedback event |
| 16 | RC event |

The 16 functions are described in the annex in the standard HAVi language. This appendix can be used to implement the invention in the context of a HAVi type architecture; it by no means limits the present invention to this architecture but constitutes an exemplary embodiment.

The various functions are explained below:

1-Remote Control: Connect

This function is used to start a new connection with the generic API. A device wants to open a new session, and sends a request. In return, the function delivers a single identifier called "long cid". In this way, a communication channel is opened between a HAVi device which wants to use the remote control and the generic API, the identifier identifies the channel from the other channels. One channel is set up, for example, for the VCR, another for the tuner, a third for the amplifier. If the API is not available, the function returns no identifier and does not open a channel.

2-Remote Control: Disconnect

This function is used to close the connection with the generic API identified by "long cid", the parameter obtained following a connection. This function is used to close the communication channel opened on a connection. The disconnect function returns an error message if the identifier entered as an input parameter is not recognized for the API.

3—Remote Control: is Supported

This function is used to check that a "KeyCode" is known to the generic API and is available. For example, following a connection, the Tuner runs this function, indicating as an input parameter the code of the key "P+". The function is boolean: if the code is supported by the API and is not associated with another HAVi device, then the function returns the value "True", otherwise it returns the value "False". This function is used to determine in detail the state of occupancy of the keys.

4-Remote Control: Get Capabilities

This function is used to obtain an overall report in the form of a list of key codes or key code groups: either busy (output value: False) or available (output value: True). Keys form a group when their functions are associated, for example the four direction arrow keys, the two keys P+ and P−, the ten keys of the numeric keypad, etc. With this function, a HAVi device knows the availability status of all the keys or groups of keys of the remote control associated with the generic API.

5-Remote Control: Add Key

This function is used to reserve a key code for a HAVi device that requests it.

When this operation is done, the key code is no longer available. For example, the amplifier sends the API two reservation requests, one for the V+code and the other for the V− code, to control the volume up or down. The reservation function returns an error code if the key code has already been assigned to a device.

6-Remote Control: Remove Key

This function is used to cancel the reservation of a key code for a given HAVi device. When this operation is done, the key code is once again available.

7-Remote Control: Add All Codes

This function is used to reserve all the codes declared available by the generic API for the HAVi device that requests it. This function avoids reserving them individually by the add key function. When this operation is done, no key codes are available. The individual reservations that had been done before this function remain operational.

8-Remote Control: Remove All Keys

This function is the reverse of the preceding one. All the keys reserved for the device that sends this request are available. This function is used to release properly the resources offered to the API when, for example, the device is switched off or it is removed from the digital communication network.

9-11-13-Remote Control: Add Group of Keys

This function is used to reserve a group of codes for the HAVi device that requests it. According to the present embodiment, there are three groups of keys: the direction arrow keys (4 keys), covered by the function number 9; the numeric keys (10 keys), function number 11; the color keys, function number 13. The color keys vary in number according to the remote controls, and are used to define customized functions such as: direct access to a predetermined menu, initialization of a device with parameters (sound, color, channel number, etc.) etc. The groups are defined in the generic API, the HAVi devices can learn about them by first executing function 4: Get capabilities.

10-12-14-Remote Control: Remove Group of Keys

These functions are the reverse of the preceding functions 9, 11, 13. All the group of keys reserved for the device that sends this request is once again available.

15-Remote Control: Force Feedback Event

Some remote controls have a vibrator function (force Feedback) for example: a joystick providing gradual feedback that can be felt by the user (for example: the joystick vibrates more or less strongly in a car game when the player leaves the road or has an accident with his car).

Depending on the value of the "forceFeedbackIntensity" parameter, the remote control vibrates more or less strongly.

16-Remote Control: RC Event

Unlike the preceding functions, this function is not a request from a HAVi device to the API, but the transmission by the API of an event occurring on the remote control. When a user presses a key, the generic API sends to the device associated with this key a message including the key code. For example, pressing the button PLAY on the remote control associated with the television is processed by the generic API which sends a message to the VCR, this message including the "PLAY" key code.

An exemplary scenario for configuring the API for the dialogue with a given HAVi device such as a set-top box is as follows:

Connect (function 1)
Get capabilities (function 4)
Add all arrow keys (function 9)
Add key: the "ENTER" key (function 5)

These functions are executed in the configuration step. Then, the user can use the remote control to control the duly configured device. During the usage step, the generic API sends event messages (see paragraph 16) to transmit to the devices concerned the commands from the user.

When the use of a device is ended, for example when the user switches it off, the device sends a disconnect request (function 2) to the generic API which releases the keys associated with this device, by deleting from the memory the references to this device. Similarly, when a device is disconnected without notifying the network, mechanisms specific to the HAVi architecture detect the disconnection and inform all the HAVi devices of the network of this event. The generic API receiving the information that a device is disconnected automatically releases the key codes assigned to that device. In this way, these duly released keys can be assigned to other devices.

The API manages a table for defining the associations between each key code of the remote control and each HAVi device which has reserved the code. In this way, the API can immediately check that a code is available and, if necessary, assign it to the device that requests it. The table has as many lines as there are control means, each line having a position for the code of a key, for example, and another for the identifier of the device making the reservation.

An enhancement consists in enabling the API to associate several devices with the same code. For example, the "OFF" function of the remote control can switch off a number of HAVi devices at the same time. This refinement modifies the code reservation function. This function then no longer returns an error message when the code is not available, it returns a message indicating that this code is already assigned to at least one device and makes the reservation. The table in the API is also modified: the field for receiving the identifier of the device associated with the key defined by the code can include a number of identifiers.

The exemplary embodiments of the invention described above were chosen for their concrete nature. It would not, however, be possible to list exhaustively all the embodiments covered by this invention. In particular, any step or any means described can be replaced by an equivalent step or means without departing from the spirit of the present invention.

---

ANNEX

Remote Control Data Structures

KeyCode

Prototype
    enum KeyCode {VK_1, VK_2, VK_3, . . . }
Description
    Values for key code are the constants whose names begin with "VK_" defined in the
    org.havi.ui.event.HRcEvent and java.awt.event.KeyEvent classes.

KeyType

Prototype
    enum KeyType { KEY_PRESSED, KEY_RELEASED}
Description
    Values for key type are the constants KEY_PRESSED and KEY_RELEASED defined
    in java.awt.event.KeyEvent.

-continued

ANNEX

Remote Control APIs

RemoteControl::Connect

Prototype
    Status RemoteControl:: Connect (
        out long cid )
Parameter
    cid - identifier of the connection. It allows starting several
        connections from a single software component and also permits
        matching a response with a request.
Description
    This command allows a software element to open an asynchronous
    connection. Each RemoteControl::Connect allows the Remote Control
    FCM to manage a context per each connected client (connection
    identifier and function to call in order to send data to its client).
Error code
    ERESOURCE_LIMIT: no more available cid, no more thread can be created RemoteControl::Disconnect Prototype
    Status RemoteControl::Disconnect ( in long cid )
Parameter
    cid - identifier of the connection between the client application and
        the Remote Control FCM (issued by a client application from a
        previous RemoteControl::Connect call).
Description
    This function allows a software element to close a RemoteControl
    connection.
Error code
    RemoteControl::ECONNECTION: cid doesn't exist
    RemoteControl::ECLIENT: the client is not allowed to access this connection
Remarks
    Sending a RemoteControl::Disconnect message will abort any
    other action being performed. Once a client called
    RemoteControl::Disconnect, the cid is no longer available.

RemoteControl:: IsSupported

Prototype
  Status RemoteControl::IsSupported (
      in long cid,
      in KeyCode keyCode,
      out boolean keySupported)
Parameter
    cid - identifier of the connection between the client application and
        the Remote Control FCM (issued by a client application from a
        previous RemoteControl::Connect call).
    keyCode - key code requested
    keySupported - identifies whether the key is supported by the
        remote control device
Description
    This API enables an application to know if the code specified by the
    key code is supported by the remote control
Error code
    RemoteControl::ECONNECTION: cid doesn't exist
    RemoteControl::ECLIENT: the client is not allowed to access this connection RemoteControl::GetCapabilities Prototype
  Status RemoteControl::GetCapabilities(
      in long cid,
      out boolean forceFeedBackAvailable,
      out boolean allKeysAvailable,
      out boolean allArrowKeysAvailable,
      out boolean allNumericKeysAvailable,
      out boolean allColourKeysAvailable)
Parameter
    cid - identifier of the connection between the client application and
        the Remote Control FCM (issued by a client application from a
        previous RemoteControl::Connect call).
    forceFeedBackAvailable - identifies whether force feedback is
        available.
    AllKeysAvailable - identifies whether all keys are available
    allArrowKeysAvailable - identifies whether all arrow keys are available
        (VK_LEFT, VK_RIGHT, VK_UP, VK_DOWN).
    allNumericKeysAvailable - identifies whether all numeric keys are
        available (VK_0, VK_1, VK_2, VK_3, VK_4, VK_5, VK_6, VK_7, -continued

ANNEX

```
        VK_8, VK_9).
    allColourKeysAvailable - identifies whether all color keys are available
        (VK_COLORED_KEY_0,    VK_COLORED_KEY_1,
        VK_COLORED_KEY_2, VK_COLORED_KEY_3).
RemoteControl:: AddKey Prototype
    Status RemoteControl::AddKey (
            in long cid,
            in KeyCode keyCode,
            out boolean keyAdded)
Parameter
        cid - identifier of the connection between the client application and
            the Remote Control FCM (issued by a client application from a
            previous RemoteControl::Connect call).
        keyCode - key code requested
        keyAdded - identifies whether the key is added by the remote control
            device
Description
    This API enables an application to add it a key with the code specified
    by the key code
Error code
        RemoteControl::ECONNECTION: cid doesn't exist
        RemoteControl::ECLIENT: the client is not allowed to access this connection
RemoteControl:: RemoveKey Prototype
    Status RemoteControl::RemoveKey (
            in long cid,
            in KeyCode keyCode,
            out boolean keyRemoved)
Parameter
        cid - identifier of the connection between the client application and
            the Remote Control FCM (issued by a client application from a
            previous RemoteControl::Connect call).
        keyCode - key code requested
        keyRemoved - identifies whether the key is removed by the remote
            control device
Description
    This API enables an application to remove it a key with the code
    specified by the key code
Error code
        RemoteControl::ECONNECTION: cid doesn't exist
        RemoteControl::ECLIENT: the client is not allowed to access this connection
RemoteControl:: AddAllKeys Prototype
    Status RemoteControl::AddAllKeys (
            in long cid,
            out boolean allKeysAdded)
Parameter
        cid - identifier of the connection between the client application and
            the Remote Control FCM (issued by a client application from a
            previous RemoteControl::Connect call).
        allKeyAdded - identifies whether all keys are added by the remote
            control device
Description
    This API enables an application to add it all keys.
Error code
        RemoteControl::ECONNECTION: cid doesn't exist
        RemoteControl::ECLIENT: the client is not allowed to access this connection
RemoteControl:: RemoveAllKeys Prototype
    Status RemoteControl::RemoveAllKeys (
            in long cid,
            out boolean allKeysRemoved)
Parameter
        cid - identifier of the connection between the client application and
            the Remote Control FCM (issued by a client application from a
            previous RemoteControl::Connect call).
        allKeyRemoved - identifies whether all keys are added by the
            remote control device
```

-continued

ANNEX

Description
    This API enables an application to remove it all keys.
Error code
    RemoteControl::ECONNECTION: cid doesn't exist
    RemoteControl::ECLIENT: the client is not allowed to access this connection RemoteControl:: AddAllArrowKeys Prototype
   Status RemoteControl::AddAllArrowKeys (
      in long cid,
      out boolean allArrowKeysAdded)
Parameter
    cid - identifier of the connection between the client application and
      the Remote Control FCM (issued by a client application from a
      previous RemoteControl::Connect call).
    allArrowKeysAdded - identifies whether arrow keys are added by
      the remote control device
Description
    This API enables an application to add it all arrow keys (VK_LEFT,
    VK_RIGHT, VK_UP, VK_DOWN).
Error code
    RemoteControl::ECONNECTION: cid doesn't exist
    RemoteControl::ECLIENT: the client is not allowed to access this connection RemoteControl:: RemoveAllArrowKeys Prototype
   Status RemoteControl::RemoveAllArrowKeys (
      in long cid,
      out boolean allArrowKeysRemoved)
Parameter
    cid - identifier of the connection between the client application and
      the Remote Control FCM (issued by a client application from a
      previous RemoteControl::Connect call).
    allArrowKeysRemoved - identifies whether all keys are added by
      the remote control device
Description
    This API enables an application to remove it all arrow keys (VK_LEFT,
    VK_RIGHT, VK_UP, VK_DOWN).
Error code
    RemoteControl::ECONNECTION: cid doesn't exist
    RemoteControl::ECLIENT: the client is not allowed to access this connection RemoteControl:: AddAllNumericKeys Prototype
   Status RemoteControl::AddAllNumericKeys (
      in long cid,
      out boolean allNumericKeysAdded)
Parameter
    cid - identifier of the connection between the client application and
      the Remote Control FCM (issued by a client application from a
      previous RemoteControl::Connect call).
    allNumericKeysAdded - identifies whether all numeric keys are added
      by the remote control device
Description
    This API enables an application to add it all numeric keys (VK_0, VK_1,
    VK_2, VK_3, VK_4, VK_5, VK_6, VK_7, VK_8, VK_9).
Error code
    RemoteControl::ECONNECTION: cid doesn't exist
    RemoteControl::ECLIENT: the client is not allowed to access this connection RemoteControl:: RemoveAllNumericKeys Prototype
   Status RemoteControl::RemoveAllNumericKeys (
      in long cid,
      out boolean allNumericKeysRemoved)
Parameter
    cid - identifier of the connection between the client application and
      the Remote Control FCM (issued by a client application from a
      previous RemoteControl::Connect call).
    allNumericKeysRemoved - identifies whether numeric keys are
      added by the remote control device
Description
    This API enables an application to remove it all numeric keys (VK_0,
    VK_1, VK_2, VK_3, VK_4, VK_5, VK_6, VK_7, VK_8, VK_9).
Error code
    RemoteControl::ECONNECTION: cid doesn't exist
    RemoteControl::ECLIENT: the client is not allowed to access this connection -continued

ANNEX

RemoteControl:: AddAllColorKeys

Prototype
   Status RemoteControl::AddAllColorKeys (
        in long cid,
        out boolean allColorKeysAdded)
Parameter
   cid - identifier of the connection between the client application and
      the Remote Control FCM (issued by a client application from a
      previous RemoteControl::Connect call).
   allColorKeyAdded - identifies whether all color keys are added by
      the remote control device
Description
   This API enables an application to add it all color keys
   (VK_COLORED_KEY_0, VK_COLORED_KEY_1, VK_COLORED_KEY_2,
   VK_COLORED_KEY_3).
Error code
   RemoteControl::ECONNECTION: cid doesn't exist
   RemoteControl::ECLIENT: the client is not allowed to access this connection RemoteControl:: RemoveAllColorKeys Prototype
   Status RemoteControl::RemoveAllColorKeys (
        in long cid,
        out boolean allColorKeysRemoved)
Parameter
   cid - identifier of the connection between the client application and
      the Remote Control FCM (issued by a client application from a
      previous RemoteControl::Connect call).
   allColorKeyRemoved - identifies whether all color keys are added
      by the remote control device
Description
   This API enables an application to remove it all color keys
   (VK_COLORED_KEY_0, VK_COLORED_KEY_1, VK_COLORED_KEY_2,
   VK_COLORED_KEY_3).
Error code
   RemoteControl::ECONNECTION: cid doesn't exist
   RemoteControl::ECLIENT: the client is not allowed to access this connection RemoteControl:: ForceFeedbackEvent Prototype
   Status RemoteControl::ForceFeedbackEvent (
        in long cid,
        in octet forceFeedbackIntensity)
Parameter
   cid - identifier of the connection between the client application and
      the Remote Control FCM (issued by a client application from a
      previous RemoteControl::Connect call).
   forceFeedbackIntensity - intensity of the force feedback (from 0
      to 127)
Description
   This API enables an application to send a force feedback event to the
   remote control.
Error code
   RemoteControl::ECONNECTION: cid doesn't exist
   RemoteControl::ECLIENT: the client is not allowed to access this connection <Client>::RCEvent Prototype
   Status <Client>::RCEvent (
        in long cid,
        in KeyCode keyCode,
        in KeyType keyType)
Parameter
   cid - identifier of the connection between the client application and
      the Remote Control FCM (issued by a client application from a
      previous RemoteControl::Connect call).
   keyCode - informs the software element client with the identifier of
      the key pressed (key code).
   keyType -- informs the software element client with the key pressed
      event type (KEY_PRESSED or KEY_RELEASED)

| -continued |
| --- |
| ANNEX |

Description
    This command causes the server (File Manager FCM) to transfer a
    copy of the file, specified in the pathname. The status and contents of
    the file at the server site shall be unaffected.
Error code
        EINVALID_PARAMETER: cid is unknown for the client

The invention claimed is:

1. Method of controlling a number of first devices linked by a communication network to a second device associated with a control device which is dedicated to said second device, the control device comprising a plurality of command input means, wherein the method comprises the steps:

receiving, on each first device via said second device, a list of the plurality of command input means of the control device, on each first device to be controlled, configuring at least one association between a function of the first device and a particular command input means included in the list received, and transmitting the at least one association by a request from the first device to a management interface of the control device available in the second device, and when the particular command input means of the control device is activated, transmitting from the second device to the first device having the function associated with this particular command input means control information identifying the activated command input means in order to execute the function on the first device.

2. Control method according to claim 1, wherein, in response to a configuration request, the method includes a sending of information indicating the absence of availability on the second device of the particular command input means identified in the request.

3. Control method according to claim 1, wherein, in response to a configuration request, the method includes a sending of information indicating the validation of the association on the second device of the input means identified in the request, and the indication of other first devices associated with this means.

4. Control method according to claim 1, wherein the method includes a deleting of an association between the at least one first device and one or more input means when said first device is deactivated.

5. Control method according to claim 1, wherein a configuration request associates a number of command input means having a common characteristic with a first device.

6. Control method according to claim 1 wherein it includes a transmission of the list of command input means available on the second device.

7. Control method according to claim 1 wherein, in response to a status request sent by a first device, the method includes a transmission by the second device of the list of associations programmed in the preceding configuration steps.

8. Device having a means of connection with a communication network and receiving signals from a dedicated control device provided with command input means; wherein the connection means sends to another device connected to the network a list of the input means of the dedicated control device and in that it includes an association means activated by this other device connected to the network, said association means storing in memory association data between a particular command input means in the list and the identifier of this other device, the connection means transmitting a block of data when a command is input on the dedicated control device, said data block including an identifier of the command entered and being intended for the device associated with this command.

9. Device according to claim 8, wherein the device includes a means of reception via the communication network of association data to be stored.

10. Device according to claim 8, wherein the device includes a means of correlation between association data received from an identified device and data already stored, and a means of transmitting a non-availability message when the command input means indicated in the received data is already associated with other device.

11. Device according to claim 9, wherein the device includes a means of correlation between association data received from an identified device and the data already stored, and a means of transmitting an availability message when the command input means indicated in the received data is not associated with another device, the association data then being written in memory.

12. Device according to claim 8, wherein the device includes a means of receiving a deactivation signal from another device linked to the network triggering the deletion of the association data associated with this other device.

13. Device according to claim 8, wherein the device includes a means of transmitting association data stored in memory activated following a request from another device connected to the network.

14. Device according to claim 8, wherein the device includes a means of transmitting the list of identifiers of the remote control input means, said transmitting means being activated following a request from another device connected to the network.

* * * * *